(12) United States Patent
Finis et al.

(10) Patent No.: US 10,223,395 B2
(45) Date of Patent: Mar. 5, 2019

(54) DERIVATION OF HIERARCHY INDEXES

(71) Applicant: SAP SE, Walldorf (DE)

(72) Inventors: Jan Finis, Munich (DE); Robert Brunel, Heidelberg (DE)

(73) Assignee: SAP SE, Walldorf (DE)

( * ) Notice: Subject to any disclaimer, the term of this patent is extended or adjusted under 35 U.S.C. 154(b) by 646 days.

(21) Appl. No.: 14/882,695

(22) Filed: Oct. 14, 2015

(65) Prior Publication Data
US 2016/0232189 A1 Aug. 11, 2016

Related U.S. Application Data

(60) Provisional application No. 62/112,358, filed on Feb. 5, 2015.

(51) Int. Cl.
*G06F 17/30* (2006.01)

(52) U.S. Cl.
CPC .. *G06F 17/30327* (2013.01); *G06F 17/30339* (2013.01)

(58) Field of Classification Search
CPC .............. G06F 17/30327; G06F 17/30339
See application file for complete search history.

(56) References Cited

U.S. PATENT DOCUMENTS

| | | | | |
|---|---|---|---|---|
| 6,279,007 B1 * | 8/2001 | Uppala | ............. | G06F 17/30961 |
| 2012/0096054 A1 * | 4/2012 | Egan | ................. | G06F 17/30501 |
| | | | | 707/812 |

OTHER PUBLICATIONS

Yang, Map-Reduce-Merge: Simplified Relational Data Processing on Large Clusters, pp. 1029-1040 (Year: 2007).*
Amagasa, T. et al.: "QRS: A Robust Numbering Scheme for XML Documents", Proceedings on the 19th International Conference on Data Engineering (ICDE '03), © 2003 IEEE, pp. 705-707.
Boncz, P. et al.: "Updating the Pre/Post Plane in MonetDB/X Query", Informal Proceedings of the Second International Workshop on XQuery Implementation, Experience, and Perspectives (XIME-P), Jun. 16-17, 2005, Baltimore, MD, USA, 6 pages.
Cai, J. et al.: "OrdPathX: Supporting Two Dimensions of Node Insertion in XML Data", DEXA 2009, LNCS 5690, pp. 332-339, 2009 © Springer-Verlag Berlin Heidelberg 2009.
Finis, J. et al.: "DeltaNI: An Efficient Labeling Scheme for Versioned Hierarchical Data", SIGMOD '13, Jun. 22-27, 2013, New York, New York, USA, © 2013, 12 pages.
Grust, T. et al.: "Staircase Join: Teach a Relational DBMS to Watch its (Axis) Steps", Proceedings of the 29th VLDB Conference, Berlin Germany, 2003, 12 pages.

(Continued)

*Primary Examiner* — Albert M Phillips, III
(74) *Attorney, Agent, or Firm* — Buckley, Maschoff & Talwalkar LLC

(57) ABSTRACT

A system includes determination, based on a plurality of rows of a table, where each of the plurality of rows associated with a respective row_id represents a respective node of a hierarchy, row_id pairs of each parent node-child node pair of the hierarchy, execution, based on the row_id pairs, of a depth-first traversal of the hierarchy to sequentially add each row_id of the plurality of rows to a hierarchy index and receive a NODE value associated with the added row_id, and, for each of the plurality of rows, update of a row based on the NODE value associated with the row_id of the row.

14 Claims, 7 Drawing Sheets

(56) References Cited

OTHER PUBLICATIONS

Halverson, A. et al.: "Mixed Mode XML Query Processing", Proceedings of the 29th VLDB Conference, Berlin Germany, 2003, 12 pages.

Haustein, M. et al.: "DeweyIDs—The Key to Fine-Grained Management of XML Documents", Proceedings of 20th Brasilian Symposium on Databases, SBBD-05, 2005, 15 pages.

Jagadish, H.V. et al.: "TIMBER: A native XML database", The VLDB Journal (2002), vol. 11, pp. 274-291, Published online: Dec. 19, 2002—© Springer-Verlag 2002.

Li, C. et al.: "QED: A Novel Quaternary Encoding to Completely Avoid Re-labeling in XML Updates", CIKM '05, Oct. 31-Nov. 4, 2005, Bremen, Germany, © 2005.

Li, C. et al.: "Efficient Processing of Updates in Dynamic XML Data", Proceedings of the 22nd International Conference on Data Engineering, ICDE '06, Apr. 3-7, 2006, 10 pages.

Li, C. et al.: "Efficient updates in dynamic XML data: from binary string to quaternary string", The VLDB Journal (2008), vol. 17, Issue 3, May 2008, 26 pages.

Li, Q. et al.: "Indexing and Querying XML Data for Regular Path Expressions", Proceedings of the 27th VLDB Conference, Roma, Italy, 2001, pp. 361-370.

Min, J. et al.: "An Efficient XML Encoding and Labeling Method for Query Processing and Updating on Dynamic XML data", Journal of Systems and Software, vol. 82, Issue 3, Mar. 2009, pp. 503-515, Elsevier Science Inc., New York, NY USA.

O'Neil, P. et al.: "ORDPATHs: Insert-Friendly XML Node Labels", SIGMOD 2004, Jun. 13-18, 2004, Paris, France, © 2004, 6 pages.

Silberstein, A. et al.: "BOXes: Efficient Maintenance of Order-Based Labeling for Dynamic XML Data", Proceedings of 21st International Conference on Data Engineering, ICDE '05, Apr. 5-8, 2005, 15 pages.

Tatarinov, I. et al.: "Storing and Querying Ordered XML Using a Relational Database System", ACM SIGMOD '2002, Jun. 4-6, Madison, Wisconsin, USA, © 2002, 13 pages.

Xu, L. et al.: "DDE: From Dewey to a Fully Dynamic XML Labeling Scheme", SIGMOD '09, Jun. 29-Jul. 2, 2009, Providence, Rhode Island, USA. © 2009, pp. 719-730.

Zhang, C. et al.: "On Supporting Containment Queries in Relational Database Management Systems", ACM SIGMOD 2001, May 21-24, Santa Barbara, California, USA, © 2001, pp. 425-436.

Yun, J. et al.: "Dynamic Interval-based Labeling Scheme for Efficient XML Query and Update Processing", Journal of Systems and Software, vol. 81, Issue 1, Jan. 2008, pp. 56-70, Elsevier Science Inc., New York, NY USA.

\* cited by examiner

| id | pid | (add'l attribute cols.) |
|---|---|---|
| A1 | NULL | ... |
| A2 | NULL | ... |
| B1 | A1 | ... |
| B2 | A1 | ... |
| C1 | B1 | ... |
| C2 | B1 | ... |
| C3 | B2 | ... |
| C4 | B2 | ... |
| D1 | C3 | ... |
| D2 | C3 | ... |
| D3 | C4 | ... |

| (row_id) | id | pid | ord |
|---|---|---|---|
| 0 | A | C | 1 |
| 1 | B | E | 1 |
| 2 | C | B | 1 |
| 3 | D | NULL | 2 |
| 4 | E | NULL | 1 |
| 5 | F | B | 2 |

*FIG. 6A*

| $r_c :=$ C.row_id | C.id | C.pid | C.ord | $r_P :=$ P.row_id | P.id | P.pid | P.ord |
|---|---|---|---|---|---|---|---|
| 0 | A | C | 1 | 2 | C | B | 1 |
| 1 | B | E | 1 | 4 | E | NULL | 1 |
| 2 | C | B | 1 | 1 | B | E | 1 |
| 3 | D | NULL | 2 | NULL | NULL | NULL | NULL |
| 4 | E | NULL | 1 | NULL | NULL | NULL | NULL |
| 5 | F | B | 2 | 1 | B | E | 1 |

*FIG. 6B*

| $r_c$ | $r_P$ | m |
|---|---|---|
| 2 | 1 | 0 |
| 4 | NULL | 1 |
| 1 | 4 | 0 |
| 0 | 2 | 0 |
| 3 | NULL | 1 |
| 5 | 1 | 0 |

*FIG. 6C*

DERIVATION OF HIERARCHY INDEXES

CROSS REFERENCE TO RELATED APPLICATIONS

This application is related to, and claims benefit to and priority of, U.S. Provisional Patent Application Ser. No. 62/112,358, filed on Feb. 5, 2015, the contents of which are hereby incorporated by reference in their entirety for all purposes.

BACKGROUND

Many aspects of business operations involve hierarchies. For example, the relationships between business employees (e.g., reporting and the geographical) are hierarchical. Since these relationships are best represented by hierarchical data structures, a relational database system operated by a business may be required to maintain hierarchical data and support queries thereof.

Hierarchies may be represented in a database schema using a simple relational encoding. A common encoding is an adjacency list, in which a node of a hierarchy is represented by a row in a table and its parent node is identified by storing the parent node's primary key in a "parent" column in the row. FIG. 1 is an example of such a table, which encodes the hierarchy of FIG. 2. The parent column pid is a foreign key onto the primary key column id. For example, since node A1 is the parent node of B1, the row with id B1 specifies A1 in its pid column.

Querying hierarchical data of an adjacency list is inefficient. Accordingly, conventional systems facilitate queries by building a hierarchy index of the hierarchical data according to an indexing scheme. Such an index must be rebuilt when the underlying table of hierarchical data is updated (e.g., an entry in the pid column is updated, a new row is added to the table, etc.). Due to the potential sizes of tables of hierarchical data and the frequency with which hierarchy indexes must be rebuilt, efficient systems for building a hierarchy index are desired.

BRIEF DESCRIPTION OF THE DRAWINGS

FIGS. 6A through 6C illustrate generation of row_id pairs from an adjacency list according to some embodiments.

DESCRIPTION

The following description is provided to enable any person in the art to make and use the described embodiments. Various modifications, however, will remain readily apparent to those in the art.

Figures 1, 2:
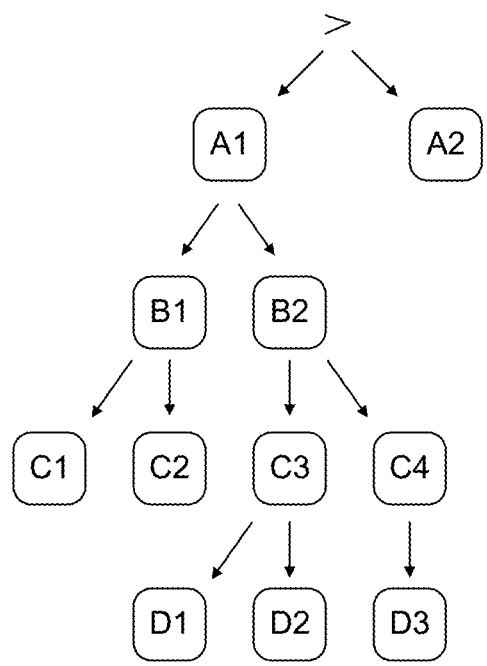
FIG. 1 illustrates an adjacency list.
FIG. 2 illustrates hierarchical data.

In the present description, the term hierarchy denotes an ordered, rooted, labeled tree, an example of which is shown in FIG. 2. "Labeled" indicates that each vertex in the tree includes a label which represents the attached data. "Rooted" indicates that a specific node is marked as the root, and all edges are conceptually oriented away from the root.

According to some embodiments, every hierarchy contains by default a single, virtual root node, which is denoted ">" in FIG. 2. The virtual root node > is hidden from the user, and the children of > are the actual roots in the hierarchical data. This mechanism may avoid certain technical complications in handling empty hierarchies as well as in handling hierarchies with multiple roots (i.e., so-called forests).

An "ordered" hierarchy is one in which an order is defined among the children of each node. For example, node B1 of FIG. 2 is ordered before node B2, and node C3 is ordered before node C4. A hierarchy can be reconstructed exactly based on its parent-child node relationships and its node order.

In a database context, a hierarchy may be associated with exactly one table. Conversely, a table might be associated with multiple hierarchies. The table of FIG. 1 is associated with one hierarchy (as shown in FIG. 2), which arranges the rows of the table in a tree, thus adding a hierarchical dimension to the table. A table associated with at least one hierarchy will be referred to as a hierarchical table.

It will be assumed that H is a hierarchy associated with a table T. Each row r of T is associated with at most one node v of H (i.e., there may be rows of table T that do not appear in the hierarchy). Conversely, each node except for > is associated with exactly one row of T. The values in the fields of r can be regarded as labels attached to v or to the edge onto v. Besides the tree structure and a node-row association, H conceptually does not contain any data. A user does not interact with the hierarchy H itself but instead works with the associated table T. Consequently, a row-to-node handle is required to enable the user to refer to the nodes in H. Such a handle may be provided by a column of data type NODE in T.

Figure 3:
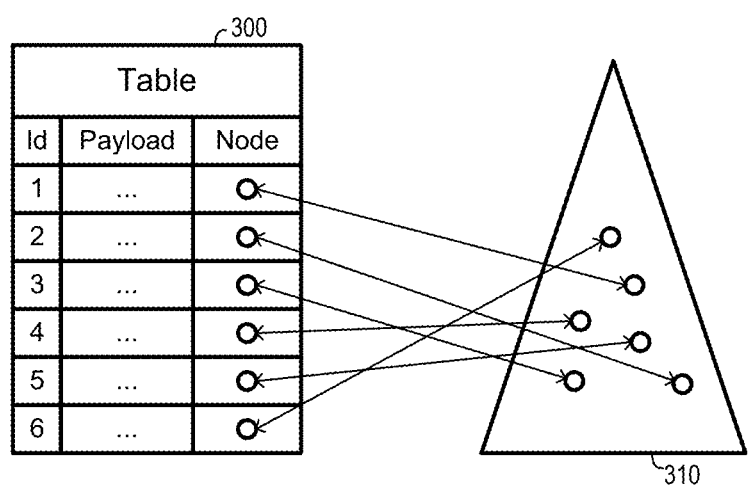
FIG. 3 illustrates a relational table of hierarchical data and a hierarchy index according to some embodiments.

A value of the data type NODE represents the position of a row's associated node within the hierarchy. The Node column represents a hierarchy representation that is backed up by an indexing scheme. As illustrated in FIG. 3, the values in the Node column of table 300 can be used to locate respective entries in hierarchy index 310 efficiently and thus serve as handles for answering queries efficiently.

Some embodiments operate to build such a Node column and a corresponding hierarchy index from an adjacency list. The actual values of the Node column depend on the indexing scheme used. For example, some indexing schemes store numbers such as the pre- and post-rank of a node in the Node column, while others store a handle into the index structure (e.g., a pointer) in the Node column. According to some embodiments, the system described herein is independent from the values and types of values stored in the Node column.

Figure 4:
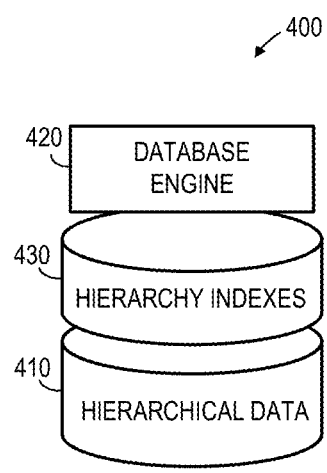
FIG. 4 is a diagram of a system architecture according to some embodiments.

FIG. 4 is a block diagram of database system 400 according to some embodiments. FIG. 4 represents a logical architecture for describing systems according to some embodiments, and actual implementations may include more or different components arranged in other manners. Database system 400 may comprise any query-responsive data source or sources that are or become known, including but not limited to a structured-query language (SQL) relational database management system. Database system 400 includes hierarchical data 410, database engine 420 and hierarchy indexes 430.

Hierarchical data 410 includes data representing nodes of a hierarchy, for example, as illustrated in FIG. 1 and FIG. 3.

Such data may be represented by conventional tabular data, row-based data stored in row format, column-based data stored in columnar format, and object-based data. Data of hierarchical data 410 which represents a given hierarchy may include a Node column as described herein, or may lack a Node column in a case that a hierarchy index associated with the hierarchy has not yet been built.

System 400 typically includes non-hierarchical data (not shown), stored along with hierarchical data 410 in a common database storage system. Also stored is metadata defining the schema of database tables of hierarchical data 410 and any stored non-hierarchical data. A database table schema may specify the name of the database table, columns of the database table, the data type associated with each column, and other information associated with the database table.

Hierarchy indexes 430 are associated with hierarchies represented within hierarchical data 410. As described above, a hierarchy of hierarchical data 410 may be associated with a Node column, and values of the Node column may be used to identify entries in an associated hierarchy index of hierarchy indexes 430, such that the position of a node in the hierarchy may be efficiently ascertained. Hierarchy indexes 430 may be built and values of associated values of Node columns may be determined as described herein.

Database system 400 may implement an "in-memory" database, in which volatile (e.g., non-disk-based) storage (e.g., Random Access Memory) is used both for cache memory and for storing the full database during operation, and persistent storage (e.g., one or more fixed disks) is used for offline persistency and maintenance of database snapshots. Alternatively, volatile storage may be used as cache memory for storing recently-used data, while persistent storage stores the full database.

Database engine 420 may implement a query engine for receiving queries from a database client (not shown), retrieving data from hierarchical data 410 based on the queries, and transmitting a query result back to the database client. Database engine 420 may also perform administrative and management functions for database system 400. Such functions may include indexing of hierarchical data 410, snapshot and backup management, optimization, garbage collection, and/or any other administrative and management functions that are or become known.

Derivation of a hierarchy index from an adjacency list using a HIERARCHY SQL expression will now be generally described. According to some embodiments, the adjacency list is an adjacency-list-formatted source table such as shown in FIG. 1, which may be a table, a view, or the result of a subquery:

HIERARCHY
USING source table AS source name
[START WHERE start condition]
JOIN PARENT parent name ON join condition
[SEARCH BY order]
SET node column name The HIERARCHY expression can be used in some embodiments wherever a table reference is allowed (in particular, a FROM clause). The result is a temporary table containing the data from the source table plus an additional NODE column named node column name. The expression is evaluated by self-joining the source table in order to derive a parent-child relation representing the edges, building a temporary hierarchy representation from the relation representing the edges, and finally generating the corresponding NODE column. The START WHERE subclause can be used to restrict the hierarchy to only the nodes that are reachable from any node satisfying a start condition. The SEARCH BY subclause can be used to specify a desired sibling order. Siblings are ordered arbitrarily if the subclause is omitted. A procedure for evaluating the whole expression according to some embodiments is as follows:

1) Evaluate source table and materialize required columns into a temporary table T. Add a NODE column named node column name to T.
2) Perform the join
T AS C LEFT OUTER JOIN T AS P ON join condition, where P is the parent name and C is the source name. Within the join condition, P and C can be used to refer to the parent and the child node, respectively.
3) Build a directed graph G containing all row_ids of T as nodes, and add an edge $r_p \rightarrow r_c$ between any two rows $r_p$ and $r_c$ that are matched through the join.
4) Traverse G, starting at rows satisfying start condition, if specified, or otherwise at rows that have no (right) partner through the outer join. If order is specified, visit siblings in that order. Check whether the traversed edges form a valid tree or forest (i.e., there are no cycles and no node has more than one parent). Raise an error if a non-tree edge is encountered.
5) Build a hierarchy representation from all edges visited during 4) and populate the NODE column of T accordingly. The result of the HIERARCHY expression is T.

Figure 5:
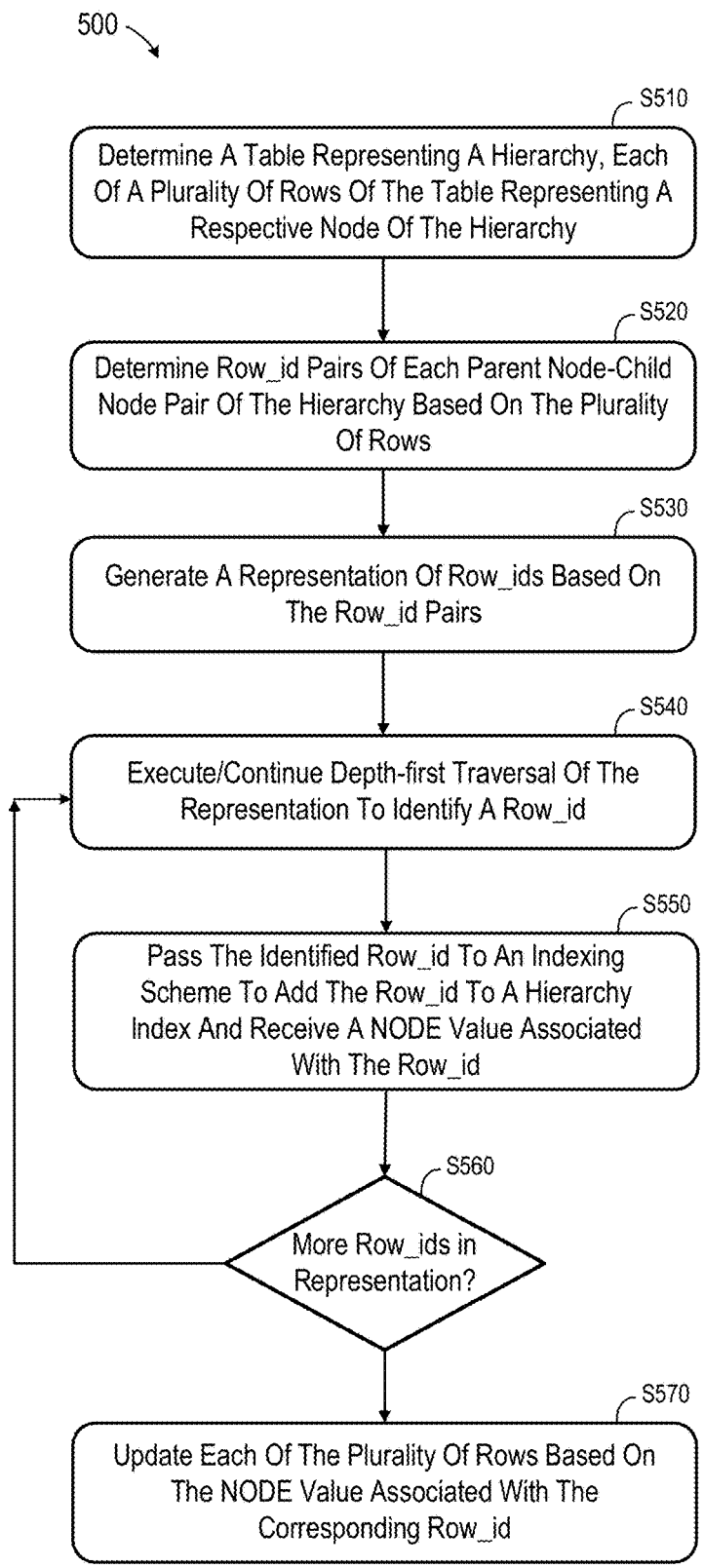
FIG. 5 is a control flow diagram of a process according to some embodiments.

The foregoing explanation of the HIERARCHY expression provides an overview of operation according to some embodiments. FIG. 5 comprises a control flow diagram of process 500 providing additional detail according to some embodiments. Accordingly, process 500 may also facilitate the building of a Node column and an associated hierarchy index based on an adjacency list according to some embodiments.

In some embodiments, various hardware elements of system 400 (e.g., one or more processors) execute program code to perform process 500. Process 500 and all other processes mentioned herein may be embodied in processor-executable program code read from one or more of non-transitory computer-readable media, such as a floppy disk, a disk-based or solid-state hard drive, CD-ROM, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Initially, at S510, a table representing a hierarchy is determined. Each of a plurality of rows of the table represents a respective node of the hierarchy. FIG. 1 provides an example of such a table according to some embodiments. As described above, some rows of the table might not represent nodes of the hierarchy. For purposes of the following example, the table will be referred to as source_table. In some embodiments of S510, source_table is evaluated and the result is materialized into a temporary table T.

Next, at S520, row_id pairs of each parent node-child node pair of the hierarchy are determined based on the plurality of rows. With reference to the table of FIG. 1, the row_id pair (0, 3) is determined because node B2 is represented by a row having row_id 3 and its parent node A1 is represented by a row having row_id 0. Accordingly, the row_id pair (0, 3) represents an edge of a hierarchy represented by the table.

To determine the row_id pairs at S520, the operation T AS C LEFT OUTER JOIN T AS P ON join_condition is evaluated. The left side C of the self-join represents the child node of an edge and the right input P the parent node of the edge. A left outer join, is used in order to also select children without a parent node. In the absence of a start_condition, these children nodes are by default the roots of the hierarchy.

The row_ids $r_p$ and $r_c$ of both join sides are selected for later use. $r_p$ can be NULL due to the outer join. If a start_condition σ is specified, tuples satisfying σ are marked with a boolean start mark m using a map operator $\chi_m=\sigma$. If order ω is specified, an ordinary SORT operator is used to sort the join result. Next, all columns except for $r_p$, $r_c$ and m (if available) are removed, resulting in a stream of row_id pairs of each parent node-child node (i.e., edges) in the desired sibling order.

An example of S520 according to some embodiments is now provided. FIG. 6A illustrates table 600, which is an adjacency-list-formatted source table. The following expression may be used to begin deriving row_id pairs at S520 based on table 600, identified as T1:
HIERARCHY
USING T1 AS cc
START WHERE pid IS NULL
JOIN PARENT pp ON cc.pid=pp.id
SEARCH BY ord
SET nod Next, T1 AS C LEFT OUTER JOIN T1 AS P ON C.pid=P.id is evaluated, yielding table 610 of FIG. 6B. Column m is then added, the table is sorted by C.ord, and columns C.* and P.* are removed, resulting in table 620 of FIG. 6C.

A representation of row_ids based on the row_id pairs is generated at S530. According to some embodiments, S530 is intended to transform the row_id pairs (i.e., the edges of the hierarchy) into a representation that can be depth-first traversed efficiently.

Figure 7:
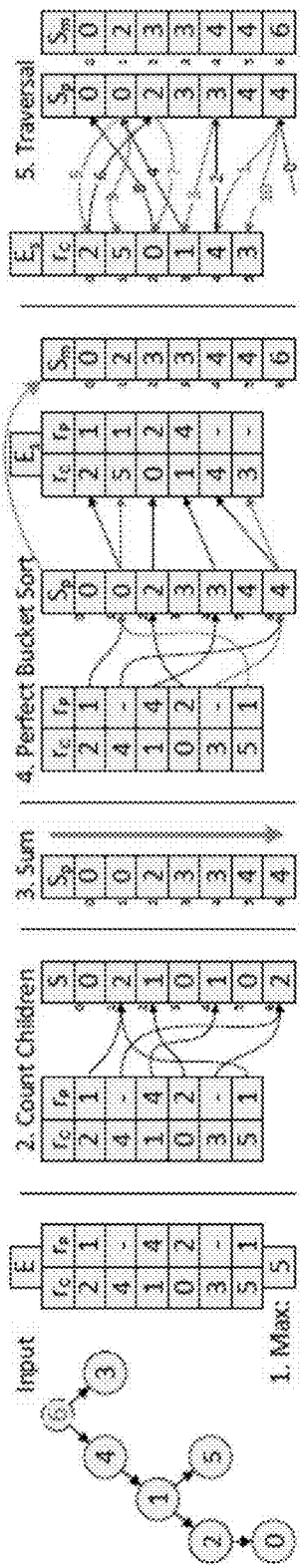
FIG. 7 illustrates a process according to some embodiments.

FIG. 7 depicts a portion of process 500 according to some embodiments. The hierarchy shown on the left depicts a hierarchy consisting of the row_id pairs determined at S520 and represented by a table T. It is noted that the row_id pairs of table T are identical to those of table 620 of FIG. 6C. The numbers inside the nodes are the row_ids of the table rows which represent the respective nodes. Although it is not part of the input row_id pairs, the virtual root node 6 is pictured as the parent of all nodes that are roots in the input row_id pairs, that is, it represents the super-root >. For clarity, start marks m are not displayed in this example (i.e., no START WHERE clause is used).

According to some embodiments of S530, the row_ids pairs are initially materialized into an edge array E. The highest row_id h which is encountered during this materialization is tracked. In the example, the highest row_id is 5 and is depicted "Max" in FIG. 7.

Next, the number of children of each node is counted by allocating an array S of size h+2 and counting the children within it. Each entry S[i] corresponds to the number of children of the node with row_id i. All edges with NULL as parent are counted in the last slot S[h+1]. For example, there are two nodes (row_ids 3 and 4) without a parent, so slot S[h+1]=S[6]=2. Node 1 has two children, so S[1]=2.

Some embodiments check whether the resulting hierarchy is a real tree or a forest by determining whether the hierarchy contains any non-tree edges. This determination may occur during counting of the child nodes, by maintaining a bitset B which tracks, for each $r_c$, whether it has been visited. Once an $r_c$ is visited more than once (i.e., once B[$r_c$] is already set when it is visited), a non-tree edge is identified and may be omitted, or the entire process may be aborted. An algorithm for counting the child nodes, including the described tree check, is as follows:

```
for all i from 0 to E.length − 1 do
    S[E[i].r_p] ← S[E[i].r_p] + 1
    if B[E[i].r_c] or (r_p = r_c) then
        abort (non-tree edge found)
    B[E[i].r_c] ← true
```

Once the counts are computed, the prefix sums $S_p$ over array S are built (i.e., $S_p[k]=\Sigma_{i=0}^{k-1}S[i]$). Step 3 of FIG. 7 illustrates building of $S_p$ according to some embodiments. To increase efficiency, the sums may be computed in-place as S is no longer needed. This computation may consist of iterating over the array from 0 to h+1 while summing up the entries and writing the prefix sum directly into S itself as follows:

```
s ← 0
for all i from 0 to h + 1 do
    t ← S[i]
    S[i] ← s
    s ← s + t
```

Continuing with the present example of S530 according to some embodiments, the prefix sums may be used to perform a "perfect" bucket sort of array E by $r_p$. The resulting sorted array is called $E_s$, illustrated in Step 4 of FIG. 7. Iterating over E, the target slot of each row ($r_c$, $r_p$, m) is looked up from $S_p[r_p]$. The value is then incremented in $S_p[r_p]$. For example, the tuple ($r_c$, $r_p$)=(2, 1) is sorted into slot 0, because $S_p[1]$=0. Subsequently, tuple (5, 1) is sorted into slot 1 because $S_p[1]$=1 now. Since the algorithm modifies $S_p$ but its original contents are needed in the next step, a copy $S_m$ of $S_p$ is made and Step 4 is executed on the copy as follows:

```
S_m = S_p
for all i from 0 to E.length − 1 do
    if E[i].r_p = < then
        j = h + 1
    else
        j = E[i].r_p
    t ← S_m[j]
    S_m[j] ← S_m[j] + 1
    E_s[t] = E[i]
```

The bucket sort may be very fast as it easily locates the target slot of each row: Only five simple operations are necessary per tuple. The asymptotic complexity of the sort is also good, because it runs in O(n) worst-case time while usual sort algorithms require at least O(n log n). In addition, rows which have the same parent stay in the same relative order, that is, the sort is stable. For example, row (2, 1) is guaranteed to be placed before (5, 1) in $E_s$. Otherwise, the desired sibling order could not be retained.

Next, at S540, $S_p$, $S_m$ and the sorted $E_s$ are used to perform a depth-first traversal to build the index (i.e., Step 5 of FIG. 7). A stack A is maintained to track the current position in the hierarchy. Traversal begins by pushing the virtual root node >, which is stored at position h+1, onto the stack. Then, as long as the stack is not empty, its topmost element c is inspected. If $S_p[c]=S_m[c]$, then the node c either has no children or its children have already been visited. c is therefore popped from the stack and traversal continues. If $S_p[c] < S_m[c]$, then c has children left to be visited. Thus, its next child is retrieved from $E_s[S_p[c]]$, visited, and subsequently pushed onto the stack.

The corresponding $(r_c, r_p)$ tuple of each visited child is passed to an indexing scheme at S550 to include the row with row_id $r_c$ in the hierarchy index.

The addToIndex operation of a chosen indexing scheme also returns a NODE value n, associated with the child, which is received at S550. The addToIndex operation is sufficient for all indexing schemes, because all indexing schemes that are currently used in modern applications can be bulk-built efficiently by sequentially adding nodes in pre-order (i.e., the order of a depth-first traversal where a parent node is ordered before its children), which is precisely the output of some embodiments.

According to some embodiments, a hierarchy indexing scheme comprises the content of a NODE column and a hierarchy index. The data which is actually stored in the NODE column depends on the chosen indexing scheme. For example, in the Pre/Size/Level scheme, the current pre-rank, subtree size, and level are tracked for each visited node during the traversal (the pre-rank and level values are incremented before proceeding with its children, the size value after visiting its children) and encoded into the corresponding NODE field. With DeltaNI (Jan Finis, Robert Brunel, Alfons Kemper, Thomas Neumann, Franz Färber, and Norman May. "DeltaNI: An efficient labeling scheme for versioned hierarchical data." In Proceedings of the 2013 ACM SIGMOD International Conference on Management of Data, pp. 905-916. ACM, 2013), an entry is added to the hierarchy index and a handle to this entry is inserted into the NODE field for each visited node.

After the current child is added to the index, the pair $(r_c, n)$ is appended to a tuple stream R. Next, c is pushed onto the stack, so that its children will subsequently be visited in a depth-first manner. Also, $S_p[c]$ is incremented because a child of c has been visited. With reference to process 500, control flow returns from S560 to S540. Control flow continues in this manner, cycling through S540-S560, until all nodes of the hierarchy have been traversed in a depth-first manner. A complete algorithm for step 5 of FIG. 7 (i.e., S540-S560) according to some embodiments is as follows:

```
1:  i ← 0
2:  A.push(h + 1)
3:  while ¬A.isEmpty( ) do
4:      c ← A.top( )
5:      if S_p[c] = S_m[c] then
6:          A.pop( )
7:      else
8:          (r_c , r_p , m) ← E_s[S_p[c]]
9:          n ← addToIndex(r_c, r_p)
10:         R.append(r_c , n)
11:         A.push(r_c)
12:         S_p[c] ← S_p[c] + 1
```

The right side of FIG. 7 depicts steps taken according to the above algorithm for the example input. Note that only the $r_c$ part of $E_s$ is shown, as $r_p$ is not important here. The algorithm first visits the nodes 4, 1, 2, 0, (arrows 0-7 in the figure) and pushes them onto the stack A. It then determines that $S_p[0]=S_m[0]=0$ and therefore pops 0 from A and checks 2. However, now $S_p[2]=S_m[2]=3$, so 2 is popped as well. At this point, $S_p[1]=1 \neq S_m[1]$ so the algorithm visits $E[S_p[1]]=$ (5, 1) (arrow 9). Finally, after popping 5, 1, and 4, the algorithm will also visit $E_s[S_p[6]]=(3, -)$ (arrow 10), thereby visiting all nodes in pre-order (4, 1, 2, 0, 5, 3). In this regard, "-" in FIG. 7 represents NULL.

Next, at S570, the node column of the temporary table T is updated based on R, which provides, as described above, a NODE value n for each row_id $r_c$.

The above algorithm does not handle usage of a START WHERE σ clause but instead builds the complete hierarchy. If the START WHERE σ clause is used, then, during the depth-first traversal, addToIndex is only called for marked nodes (i.e., nodes for which m=true) and their descendants. All other nodes are traversed but not added to the index. The modified algorithm is as follows:

```
1:  i ← 0
2:  A.push(h + 1, false)
3:  while ¬A.isEmpty( ) do
4:      (c,m') ← A.top( )
5:      if S_p[c] = S_m[c] then
6:          A.pop( )
7:      else
8:          (r_c, r_p , m) ← E_s[S_p[c]]
9:          m" ← m ∨ m'
10:         if m" then
11:             n ← addToIndex(r_c, r_p)
12:             R.append(r_c, n)
13:         A.push(r_c, m")
14:         S_p[c] ← S_p[c] + 1
```

As shown, the modified algorithm alters the stack to contain (row_id, mark) pairs. The mark in this pair determines if the node is a node that should be added to the index. A newly-traversed node is added to the index if it either satisfies σ itself (i.e., its m is set) or if its parent has already been added to the index (i.e., m' from the top of the stack is set). This combined information is stored in m".

When a SEARCH BY ω subclause is specified, some embodiments may execute a complete sort before executing the bulk build. However, the sorting can also be done after the bucket sort. The latter option has the advantage that only tuples with the same parent, and not all tuples, have to be sorted, which will speed up the sort considerably. A disadvantage is that all columns that appear in ω have to be maintained in E. Therefore, late sorting is an option that can be enabled if the sort performance appears to be the bottleneck of the operation.

Figure 8:
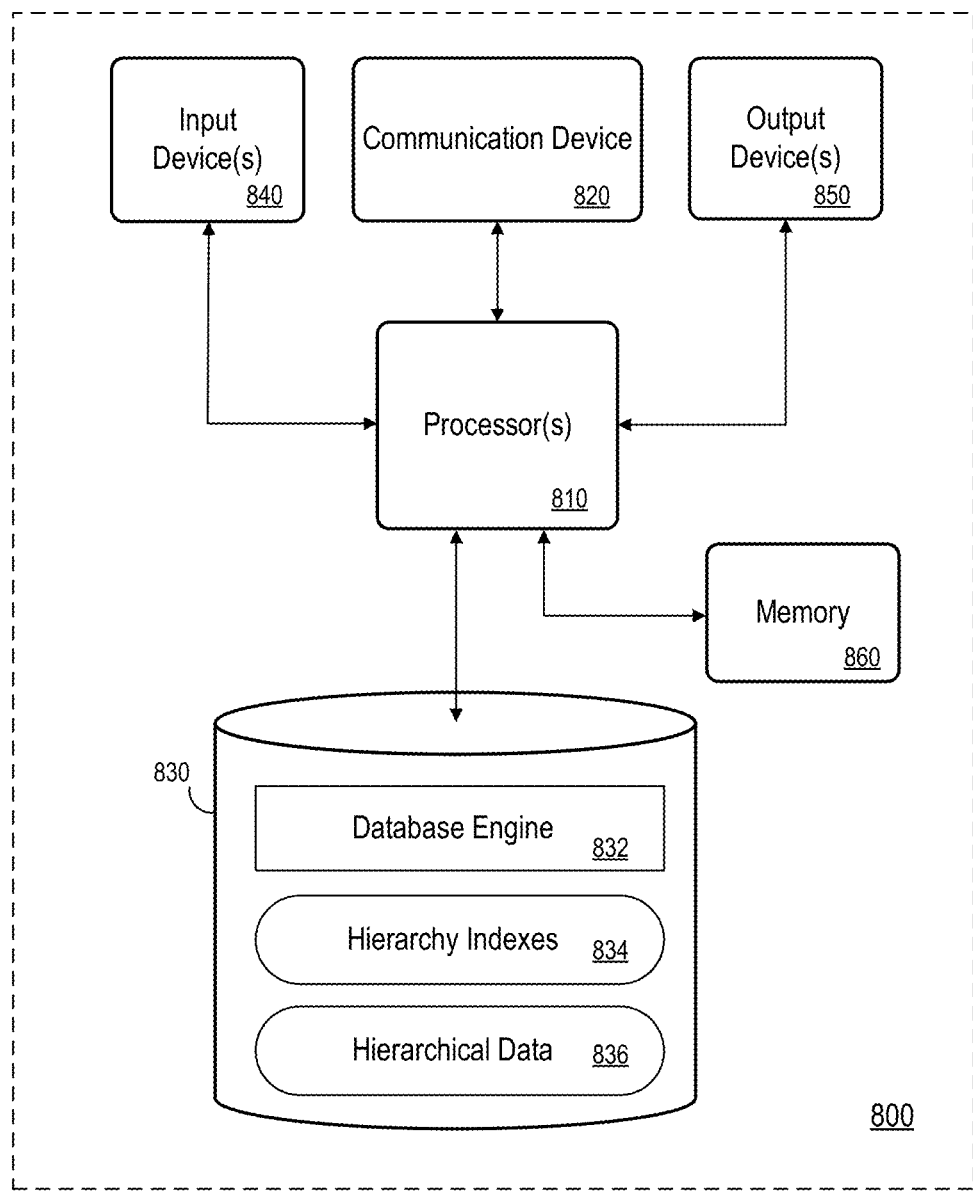
FIG. 8 is a block diagram of a computing system according to some embodiments.

FIG. 8 is a block diagram of system 800 according to some embodiments. System 800 may comprise a general-purpose computing system and may execute program code to perform any of the processes described herein. System 800 may comprise an implementation of database system 400 according to some embodiments. System 800 may include other unshown elements according to some embodiments.

System 800 includes processor(s) 810 operatively coupled to communication device 820, data storage device 830, one or more input devices 840, one or more output devices 850 and memory 860. Communication device 820 may facilitate communication with external devices, such as a reporting client, or a data storage device. Input device(s) 840 may comprise, for example, a keyboard, a keypad, a mouse or other pointing device, a microphone, knob or a switch, an infra-red (IR) port, a docking station, and/or a touch screen. Input device(s) 840 may be used, for example, to enter information into apparatus 800. Output device(s) 850 may comprise, for example, a display (e.g., a display screen) a speaker, and/or a printer.

Data storage device 830 may comprise any appropriate persistent storage device, including combinations of magnetic storage devices (e.g., magnetic tape, hard disk drives and flash memory), optical storage devices, Read Only Memory (ROM) devices, etc., while memory 860 may comprise Random Access Memory (RAM).

Database engine 832 may comprise program code executed by processor(s) 810 to cause apparatus 800 to perform any one or more of the processes described herein. For example, database engine 832 may include program code to generate a hierarchy index and corresponding Node column values from an adjacency list. Database engine 832 may also comprise program code executed by processor(s) 810 to cause apparatus 800 to execute an addToIndex method of an indexing scheme.

Hierarchy indexes 834 may include indexes associated with hierarchies represented within hierarchical data 836. Hierarchy indexes 834 may be rebuilt in response to changes to these hierarchies as described above. Indexes 834 may conform to any indexing scheme that is or becomes known, and may assist database engine 832 in responding to queries of hierarchical data 836.

Hierarchical data 836 may include adjacency lists as described above and may include tables including a NODE column to abstractly represent node positions within a hierarchy. As also described above, hierarchy indexes 834 and hierarchical data 836 may be implemented using volatile memory such as memory 860. Data storage device 830 may also store other data and program code for providing additional functionality and/or which are necessary for operation of system 800, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each system described herein may be implemented by any number of devices in communication via any number of other public and/or private networks. Two or more of such computing devices may be located remote from one another and may communicate with one another via any known manner of network(s) and/or a dedicated connection. Each device may comprise any number of hardware and/or software elements suitable to provide the functions described herein as well as any other functions. For example, any computing device used in an implementation of system 100 may include a processor to execute program code such that the computing device operates as described herein.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Embodiments described herein are solely for the purpose of illustration. Those skilled in the art will recognize other embodiments may be practiced with modifications and alterations to that described above.

What is claimed is:

1. A computing system comprising:
   a storage device storing a table, the table comprising a plurality of rows, each of the plurality of rows associated with a respective row_id representing a respective node of a hierarchy;
   a memory storing processor-executable program code; and
   a processor to execute the processor-executable program code in order to cause the computing system to:
   determine row_id pairs of each parent node-child node pair of the hierarchy based on the plurality of rows;
   generate a representation of row_ids based on the row_id pairs, wherein the generation further comprises:
   creation of an array S with S[i] equal to the number of children of a node associated with row_id i;
   generation of prefix sums $S_p$ over array S, where $S_p[k] = \sum_{i=0}^{k-1} S[i]$; and
   generation of the representation of row_ids based on the row_id pairs and the prefix sums $S_p$;
   based on the row_id pairs, execute a depth-first traversal of the hierarchy to sequentially add each row_id of the plurality of rows to a hierarchy index and receive a NODE value associated with the added row_id, and based on the representation, sequentially identify next row_ids in the depth-first traversal of the hierarchy; and
   for each of the plurality of rows, update a row based on the NODE value associated with the row_id of the row.

2. A computing system according to claim 1, wherein generation of the representation of row_ids based on the row_id pairs and the prefix sums $S_p$ comprises executing a bucket sort of the row_id pairs based on the prefix sums $S_p$.

3. A computing system according to claim 1, wherein the storage device stores a second table, the second table comprising a second plurality of, each of the second plurality of rows associated with a respective row_id representing a respective a node of a second hierarchy, the processor to further execute the processor-executable program code in order to cause the computing system to:
   determine second row_id pairs of each parent node-child node pair of the second hierarchy based on the second plurality of rows;
   based on the second row_id pairs, execute a depth-first traversal of the second hierarchy to sequentially add each row_id of the second plurality of rows to a second hierarchy index and receive a NODE value associated with the added row_id of the second plurality of rows; and
   for each of the of the second plurality of rows plurality of rows, update a row based on the NODE value associated with the row_id of the row.

4. A computing system according to claim 3, wherein sequentially adding of each row_id of the plurality of rows to the hierarchy index comprises passing each row_id to an indexing scheme, and
   wherein sequentially adding of each row_id of the second plurality of rows to the second hierarchy index comprises passing each row_id to the indexing scheme.

5. A computing system according to claim 1, wherein determination of the row_id pairs of each parent node-child node pair of the hierarchy based on the plurality of rows comprises:
   execution of a left outer self join on the table.

6. A non-transitory computer-readable medium storing program code, the program code executable by a processor of a computing system to cause the computing system to:
   determine, based on a plurality of rows of a table, where each of the plurality of rows associated with a respective row_id representing a respective a node of a hierarchy, row_id pairs of each parent node-child node pair of the hierarchy;
   generate a representation of row_ids based on the row_id pairs, wherein the generation further comprises:
   creation of an array S with S[i] equal to the number of children of a node associated with row_id i;
   generation of prefix sums $S_p$ over array S, where $S_p[k] = \sum_{i=0}^{k-1} S[i]$; and generation of the representation of row_ids based on the row_id pairs and the prefix sums $S_p$;

based on the row_id pairs, execute a depth-first traversal of the hierarchy to sequentially add each row_id of the plurality of rows to a hierarchy index and receive a NODE value associated with the added row_id, and based on the representation, sequentially identify next row_ids in the depth-first traversal of the hierarchy; and for each of the plurality of rows, update a row based on the NODE value associated with the row_id of the row.

7. A medium according to claim 6, wherein generation of the representation of row_ids based on the row_id pairs and the prefix sums $S_p$ comprises executing a bucket sort of the row_id pairs based on the prefix sums $S_p$.

8. A medium according to claim 6, the program code further executable by a processor of the computing system to cause the computing system to:

determine, based on a second plurality of rows of a second table, where each of the second plurality of rows associated with a respective row_id representing a respective a node of a second hierarchy, second row_id pairs of each parent node-child node pair of the second hierarchy;

based on the second row_id pairs, execute a depth-first traversal of the second hierarchy to sequentially add each row_id of the second plurality of rows to a second hierarchy index and receive a NODE value associated with the added row_id of the second plurality of rows; and for each of the of the second plurality of rows plurality of rows, update a row based on the NODE value associated with the row_id of the row.

9. A medium according to claim 8, wherein sequentially adding of each row_id of the plurality of rows to the hierarchy index comprises passing each row_id to an indexing scheme, and wherein sequentially adding of each row_id of the second plurality of rows to the second hierarchy index comprises passing each row_id to the indexing scheme.

10. A medium according to claim 6, wherein determination of the row_id pairs of each parent node-child node pair of the hierarchy based on the plurality of rows comprises:

execution of a left outer self join on the table.

11. A method comprising:

determining, based on a plurality of rows of a table, where each of the plurality of rows associated with a respective row_id representing a respective a node of a hierarchy, row_id pairs of each parent node-child node pair of the hierarchy;

executing a bucket sort of the row_id pairs, wherein executing the bucket sort further comprises:

creating an array S with S[i] equal to the number of children of a node associated with row_id i;

generating prefix sums $S_p$ over array S, where $S_p[k] = \Sigma_{i=0}^{k-1} S[i]$; and executing the bucket sort based on the row_id pairs and the prefix sums $S_p$;

based on the sorted row_id pairs, executing a depth-first traversal of the hierarchy to sequentially add each row_id of the plurality of rows to a hierarchy index and receive a NODE value associated with the added row_id, and based on the sorted row_id pairs, sequentially identifying next row_ids in a depth-first traversal of the hierarchy; and for each of the plurality of rows, updating a row based on the NODE value associated with the row_id of the row.

12. A method according to claim 11, further comprising:

determining, based on a second plurality of rows of a second table, where each of the second plurality of rows associated with a respective row_id representing a respective a node of a second hierarchy, second row_id pairs of each parent node-child node pair of the second hierarchy;

based on the second row_id pairs, executing a depth-first traversal of the second hierarchy to sequentially add each row_id of the second plurality of rows to a second hierarchy index and receive a NODE value associated with the added row_id of the second plurality of rows; and for each of the of the second plurality of rows plurality of rows, updating a row based on the NODE value associated with the row_id of the row.

13. A method according to claim 12, wherein sequentially adding each row_id of the plurality of rows to the hierarchy index comprises passing each row_id to an indexing scheme, and wherein sequentially adding each row_id of the second plurality of rows to the second hierarchy index comprises passing each row_id to the indexing scheme.

14. A method according to claim 11, wherein determining the row_id pairs of each parent node-child node pair of the hierarchy based on the plurality of rows comprises:

executing a left outer self join on the table.

\* \* \* \* \*